(12) United States Patent
Moertl et al.

(10) Patent No.: US 9,858,146 B2
(45) Date of Patent: Jan. 2, 2018

(54) REDUCING LATENCY FOR RAID DESTAGE OPERATIONS

(71) Applicant: International Business Machines Corporation, Armonk, NY (US)

(72) Inventors: Daniel F. Moertl, Rochester, MN (US); Gowrisankar Radhakrishnan, Colorado Springs, CO (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 14/976,693

(22) Filed: Dec. 21, 2015

(65) Prior Publication Data

US 2017/0177437 A1    Jun. 22, 2017

(51) Int. Cl.
*G06F 11/10* (2006.01)
*G06F 3/06* (2006.01)
*G06F 11/32* (2006.01)

(52) U.S. Cl.
CPC .......... *G06F 11/1076* (2013.01); *G06F 3/064* (2013.01); *G06F 3/0619* (2013.01); *G06F 3/0689* (2013.01)

(58) Field of Classification Search
CPC .... G06F 11/1076; G06F 3/0619; G06F 3/064; G06F 3/0689
See application file for complete search history.

(56) References Cited

U.S. PATENT DOCUMENTS

| | | |
|---|---|---|
| 5,860,003 A | 1/1999 | Eidler et al. |
| 5,892,969 A | 4/1999 | Young |
| 6,370,611 B1 * | 4/2002 | Callison ............... G06F 11/108 710/35 |
| 6,665,773 B1 | 12/2003 | McCombs |
| 7,913,148 B2 | 3/2011 | Stolowitz |
| 8,495,259 B2 | 7/2013 | Bakke et al. |
| 8,516,164 B2 | 8/2013 | Bakke et al. |
| 8,656,213 B2 | 2/2014 | Bakke et al. |
| 8,856,479 B2 | 10/2014 | Gerhard et al. |
| 2005/0223269 A1 * | 10/2005 | Stolowitz ............. G06F 3/0617 714/6.12 |
| 2008/0040402 A1 * | 2/2008 | Judd .................. G06F 11/2066 |

FOREIGN PATENT DOCUMENTS

GB       2506046 B    12/2014

* cited by examiner

*Primary Examiner* — April Y Blair
*Assistant Examiner* — Dipakkumar Gandhi
(74) *Attorney, Agent, or Firm* — Jared Chaney (57) ABSTRACT

A method for performing a cycle update on a RAID storage device by a storage system includes storing first data in a first buffer. The method additionally includes retrieving a command block associated with the first data, and executing the command block to perform a set of operations in a sequence specified by the command block. The set of operations includes reading second data from an address of the RAID storage device and generating redundant data based on the first data with the second data. The set of operations further includes storing the redundant data in a second buffer and writing the first data to the address of the RAID storage device when the RAID storage device is a data storage device, and writhing the redundant data stored in the second buffer to the address of the RAID storage device when the RAID storage device is a parity storage device.

16 Claims, 5 Drawing Sheets

REDUCING LATENCY FOR RAID DESTAGE OPERATIONS

BACKGROUND

The present disclosure relates to computer hardware, and more specifically, to the control of data storage systems to reduce latency for RAID storage device update operations.

Storage systems may use redundant arrays of independent disks (RAID) to improve the speed, efficiency, and reliability of storage devices. These RAID storage systems may provide data storage services to multiple host computing systems. Some RAID storage systems may be hardware based, having hardware components for servicing data storage requests and for presenting the host systems with one or more logical views of the storage system. Hardware based RAID storage systems may include a storage controller, logically situated between the host computing systems and the RAID storage devices, having a memory and data processing capabilities.

SUMMARY

According to embodiments of the present disclosure, a method for performing a cycle update on a RAID (redundant array of independent disks) storage device by a storage system may include storing first data in a first buffer. The method may additionally include retrieving a command block associated with the first data from a command block queue, and executing the command block to perform a set of operations in a sequence specified by the command block. The set of operations may include reading second data from an address of the RAID storage device and generating redundant data based on the first data with the second data. The set of operations may further include storing the redundant data in a second buffer and writing the first data to the address of the RAID storage device when the RAID storage device is a data storage device, and writhing the redundant data stored in the second buffer to the address of the RAID storage device when the RAID storage device is a parity storage device.

Other embodiments are directed towards a storage system for implementing a method for performing a cycle update on a RAID storage device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data storage systems, more particular aspects relate to the control of data storage systems to reduce the latency associated with RAID storage device update operations. While the present disclosure is not necessarily limited to such applications, various aspects of the disclosure may be appreciated through a discussion of various examples using this context.

Hardware based RAID storage systems may include a nonvolatile memory for temporarily storing (e.g., caching) data received from host computing systems (e.g., write data) for writing to a RAID storage device. These RAID storage systems may improve the efficiency and speed of storage operations by caching write data in the nonvolatile memory during periods of high utilization (e.g., periods where the storage system is servicing a large volume of read and write requests). The RAID storage system may the update the RAID storage device with the cached write data when utilization falls below a threshold level or at some other specified time.

The process of updating a RAID storage device with cached data may be referred to as destaging. Destaging may include executing, by a RAID storage system, of a chain of distinct commands for updating data records and corresponding parity blocks on RAID storage devices. In a RAID storage system, reading or writing a storage device may be specified in a serial attached small computer system interface (SAS) command. Each command block may specify a set of operations to cause the storage system to execute a command (e.g., an SAS read command and/or SAS write command) in the chain (e.g., a command block chain). Executing each of these command blocks may incur costs (e.g., in processor utilization, and storage/memory device accesses) which may limit the bandwidth of storage systems, and increase the latency associated with an overall storage operation (e.g., a destage operations) being implemented by a chain these commands. A RAID 5 cache destage operation, for example, requires the execution 5 distinct command blocks, collectively resulting in 4 SAS storage device accesses and 8 memory array accesses. Similarly, a RAID 6 cache destage operation requires the execution of 7 distinct command blocks, collectively resulting 6 SAS storage device accesses and 11 memory array accesses.

RAID storage systems may improve performance of storage operations, including, for example, destage operations, by implementing command block chaining. Command block chaining may be implemented by configuring each command block in the command block chain to include a pointer to the next (or a succeeding) command block in the chain. After a command block is executed, the pointer to the next command block is used to add that command block to a work queue (e.g., a data structure for storing command blocks until they can be executed by a storage system) for execution. The depth or occupancy of a work queue associated with a storage system having a heavy workload may be such that the execution of two consecutive command blocks from a given chain may be separated by the execution of several other command blocks from other chains. Chaining, consequently, can increase the time between the execution of a first command block in a command block chain and the execution of the last command block in the same chain. The result may be an increase in the latency of an overall storage operation.

Embodiments of the present disclosure are based on the recognition that the latency associated with RAID destage operations may be reduced, and the RAID storage system efficiency may be improved, by combining two or more command blocks from a RAID destage command block chain into a single command block. The present disclosure, for example, provides a technique for combining a RAID 5/6 XOR-on-the-fly command block with a Device Write Command block. The XOR-on-the-fly command blocks for updating a parity block associated with a stored record that will be replaced by a new data record in a destage operation, are always followed (in a destage command block chain) by a Device Write command block for writing the new data record or the new parity record. Furthermore, the XOR-on-the-fly command block contains the parameters (or control fields) needed to enable the storage system to execute the Device Write operation described in the Device Write command block (e.g., the XOR-on-the-fly command contains the parameters included in the Device Write command block). The present disclosure takes advantage of these two observations to merge the XOR-on-the-fly and the Device Write commands blocks by adding an "enable bit" to the XOR-on-the-fly command block to create a modified XOR-on-the-fly command block. The storage system's processing unit (e.g., an SAS hardware state machine) may be configured to execute the Device Write operation immediately (e.g., without adding a Device Write command block including the Device Write operation to the work queue, and without executing a different command block before executing the Device write operation) after executing an XOR-on-fly operation when the enable bit is set in the modified XOR-on-fly command block. Various embodiments of the present disclosure include a method, system, and design structure for implementing this technique.

As used herein, a command block may be a data structured configured to be transmitted to, or exchanged between devices (e.g., a storage controller and a storage device) communicating over a communications bus using the SAS communications protocol. A command block may include a set of control fields (or parameters) for causing the storage controller to execute a set of operations specified by the command block. Executing a command block may include decoding the command fields to perform the operations specified by the command block.

Figure 1:
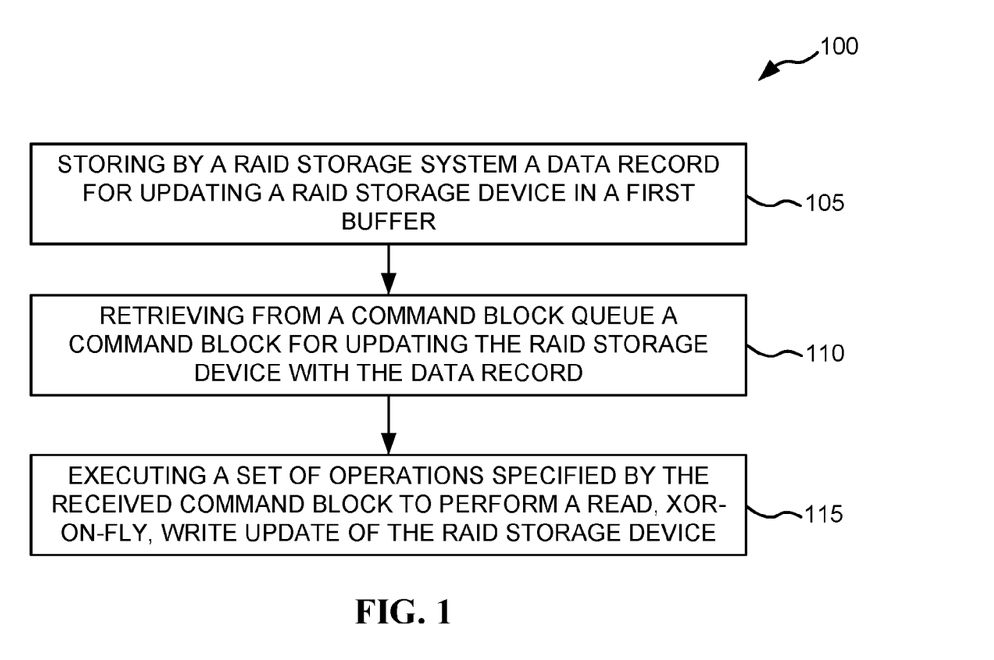
FIG. 1 depicts a flowchart of a set of computer implemented operations for controlling a data storage system to reduce the latency associated with RAID storage device update operations, according to various embodiments.
Figure 3:
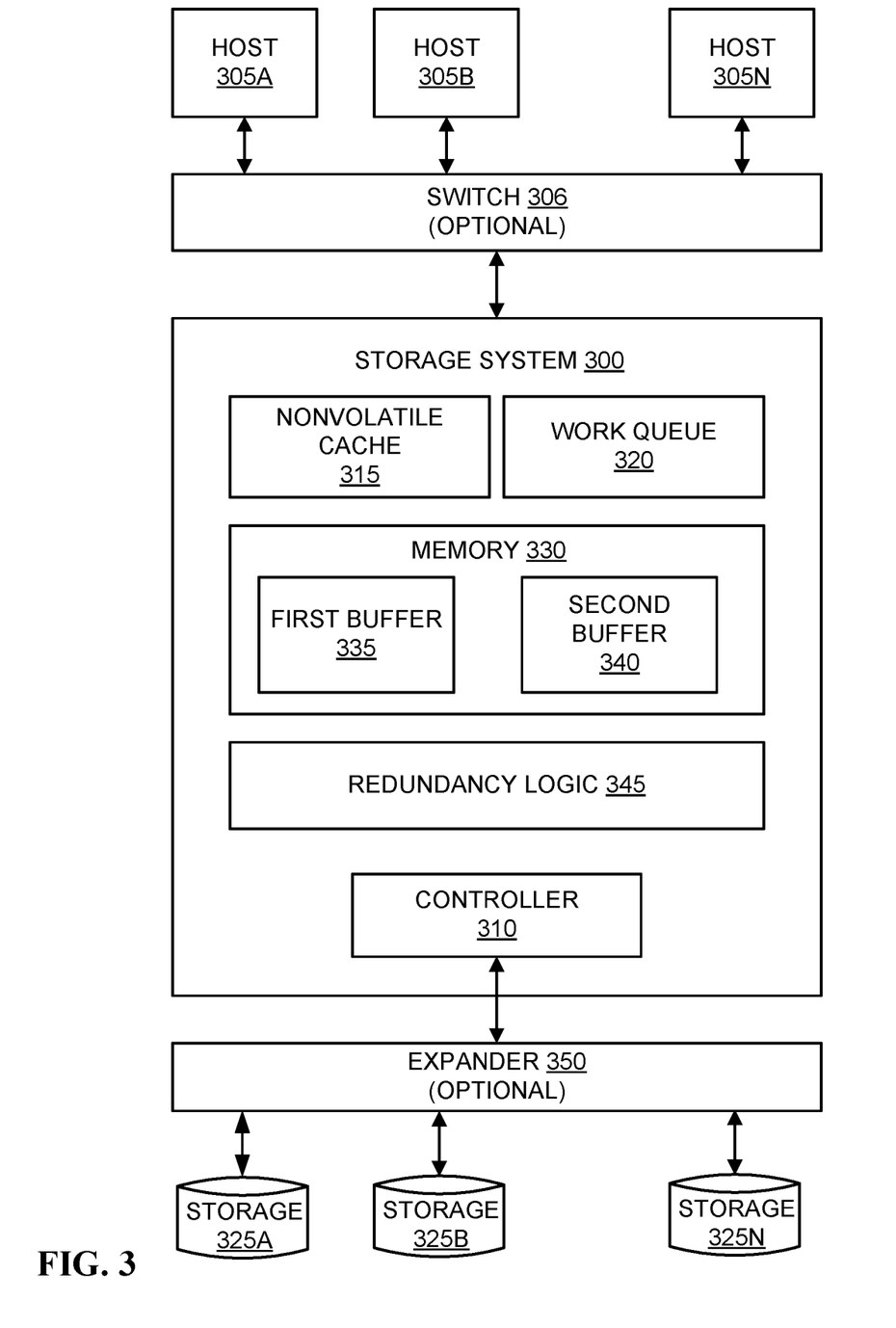
FIG. 3 depicts a block diagram of an example storage system for implementing a set of operations for controlling a data storage system to reduce the latency associated with RAID storage device update operations, according to various embodiments.

Referring now to the figures, FIG. 1 depicts flowchart 100 of a set of computer implemented operations for controlling a data storage system to reduce the latency associated with RAID storage device update operations, according to various embodiments. The operations depicted in the flowchart 100 may be executed by hardware and/or software components of a data storage system or other computing device. For example, the operations of flowchart 100 may be executed by the data storage system 300 (FIG. 3). In some embodiments, the operations of flowchart 100 may be executed while executing a command block chain for performing a RAID 5/6 data destage update.

The storage system may begin the operations of flowchart 100 at operation 105 by storing a data record for updating a RAID storage device in a memory buffer of the storage system. The storage system may receive the data record from a host computing device such as Host 300 (FIG. 3) as part of a request from the host to write the data record to a RAID storage device. The data record may be a block, frame, sector, string, or other unit of data (e.g., binary data). In some embodiments, the host storage system be configured to store the received data record in a nonvolatile cache. The storage system, for example, may store the data record in the nonvolatile cache during periods of high utilization.

In some embodiments, the storage system may transfer the cached data record to, and store the cached data record in, a first data buffer (e.g., a dynamic random access memory, DRAM, buffer) by executing a command block (e.g., an copy command block) configured with a set of operations for transferring a data record from a nonvolatile cache to the first data buffer. The copy command block may be the first command block in a command block chain for performing a RAID destage operation. In some embodiments, the command block chain may be generated by the storage system to write the cached data record to a RAID storage device.

The storage system may continue the operations of flowchart 100 by executing operation 110. Executing operation 110 may include retrieving from a work queue (e.g., a command block queue) a command block configured with operations to cause the storage system to update a RAID storage device with the data record transferred to the first data buffer in operation 105. In some embodiments, the command block may be an XOR-on-the-fly command block configured to direct the storage system to read a first data record from a storage device and exclusive-OR it with a second data record stored in a buffer, as described herein. In certain embodiments, the command block may be an XOR-on-the-fly command block where the control fields are modified to include (or add) a bit (or other unit of data) to direct the storage system to execute a RAID Device Write operation in addition to the set of operations specified by an XOR-on-the-fly command block. An XOR-on-the-fly command block modified in this way may be referred to, herein, as a modified XOR-on-the-fly command block.

The storage system may continue executing the operations of flowchart 100 by executing the set of operations specified in the retrieved command block (e.g., the modified XOR-on-the-fly command block), as shown in operation 115. In some embodiments, the set of operations specified by the retrieved command block may be executed as a single atomic sequence of operations. Executing the set of operations as a single atomic sequence may include executing or processing each operation in succession without unrelated an operation (e.g., an operation from a different command block) being executed between the execution of any two operations from the set. The retrieved command block may include a set of operations to cause the storage system to: 1) retrieve a data record from a storage device, 2) XOR (e.g., bitwise exclusive-OR) the retrieved data record with a second data record stored (e.g., previously cached data record or a data record generated in another operation) in a first buffer, where the second data record is the same size (e.g., spans or includes the same number of data units) as the retrieved data record, 3) store the result of XORing the retrieved data record with the second data record in a second buffer, and 4) write the second data record to the RAID storage device. The retrieved command block may further include a set of parameters or control fields to enable the storage system to execute the included set of operations.

While an example embodiment of the operations of flowchart 100 is described herein, other variants of the flowchart 100 are contemplated. In some variants one or more operations of the flowchart 100 may be executed in a different order than indicated in FIG. 1. In other embodiments, additional operations may be added to further the execution of the operations of flowchart 100. In certain embodiments, for example, the data record transferred to the data buffer in operation 105 may be transferred from a memory other than a nonvolatile cache. The data record, for example, may be transferred from a volatile memory (e.g., a register) temporarily storing an output of an operation previously executed by the storage system. Furthermore, the data record may be transferred to the data buffer as a result of executing operations specified in a command block that are different than the command block for transferring a data record from a nonvolatile cache to the data buffer. The data record may be transferred by executing a modified XOR-on-the-fly command block, as described herein.

Figure 2:
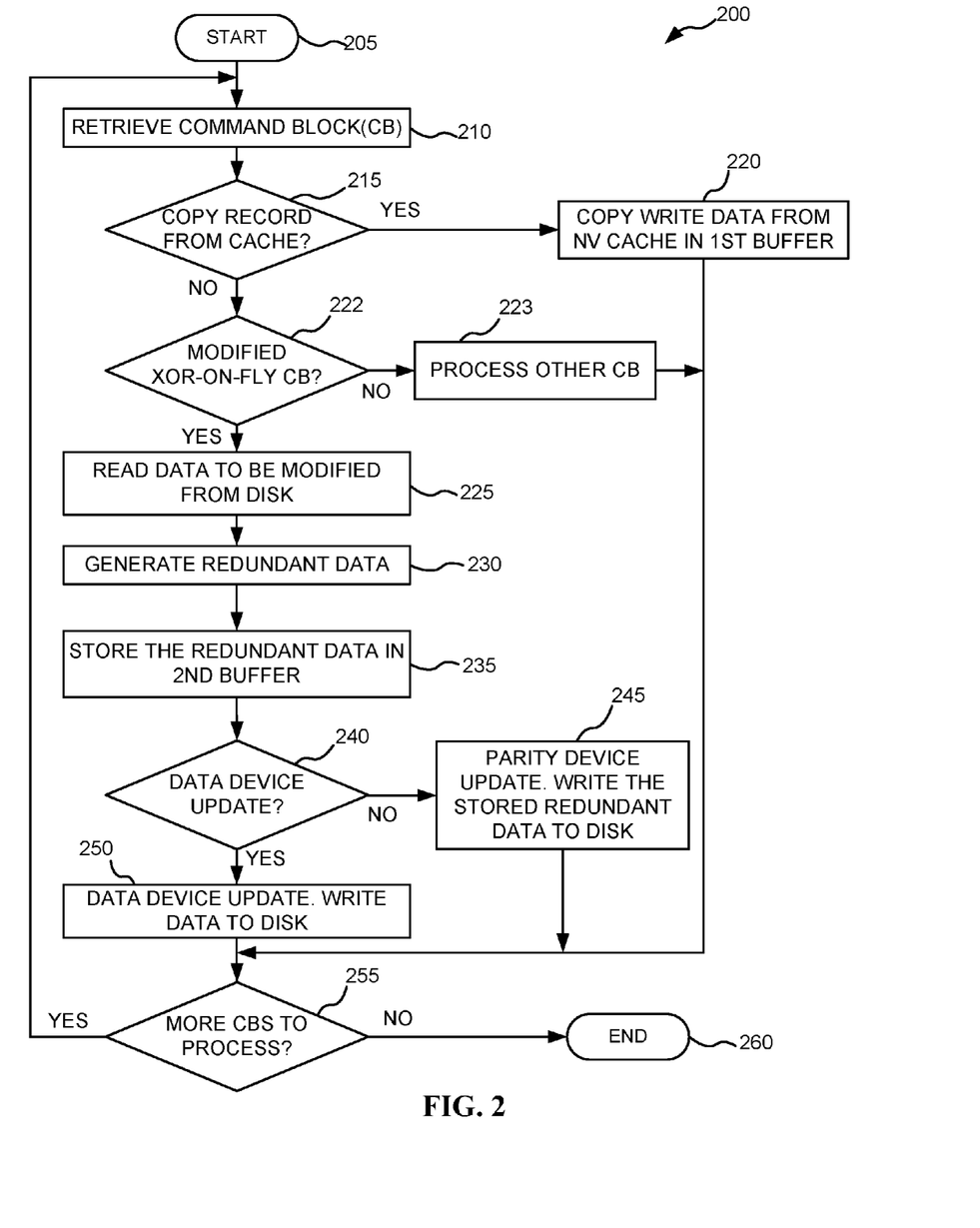
FIG. 2 depicts a flowchart of an example embodiment of a set of computer implemented operations for controlling a data storage system to reduce the latency associated with RAID storage device update operations, according to various embodiments.

FIG. 2 depicts a flowchart 200 of an example embodiment of a set of computer implemented operations for controlling a data storage system to reduce the latency associated with RAID storage device update operations, according to various embodiments. The operations depicted in the flowchart 200 may be executed by hardware and/or software components of a data storage system or other computing device. For example, the operations of flowchart 200 may be executed by the data storage system 300 (FIG. 3). In some embodiments, the operations of flowchart 200 may be executed as part of the execution of a command block chain for performing a RAID 5/6 data destage update.

The storage system may begin the operations of the flowchart 200 at operation 205 by, for example, receiving, from a host computing system, a data record to be written to a RAID storage device. The received data record may be stored in a nonvolatile cache. The storage system may receive the data record in a command block (e.g., a peripheral component interconnect command block) having parameters or control fields specifying, inter alia, a location (e.g., a logical or physical location) on the storage system to write the data record. In some embodiments, the storage system may also store some or all of the parameters or control fields in the nonvolatile cache. In some embodiments, the storage system may use the parameters to generate a command block and/or a command block chain for writing the data record to a given RAID storage device. The generated command block chain, or a first command block in the chain may be added to a storage controller work queue for processing.

The storage system may continue the operations of the flowchart 200 by executing operation 210, retrieving a command block from a work queue. In some embodiments, the storage system may generate the command block (and add it to the work queue) based on data and/or parameters received from a host computing system in a data write request. In certain embodiments, the storage system may generate the command block in response to other system events, including, for example, a determination that a cache destage operation should be executed.

The storage system may continue to operation 215 and determine whether the retrieved command block specifies operations for copying a data record from a nonvolatile cache to a data buffer (e.g., a first data buffer). In some embodiments, the retrieved command block may specify operations for decompressing the data record before or after the data record is copied to the data buffer. The storage system may proceed to operation 220 when the command block specifies operations for copying a data record from the nonvolatile cache, while the storage system may continue to operation 222 when the command block does not specify operations for copying a data record from the nonvolatile cache.

The storage system may execute operation 220 by copying the data record from the nonvolatile cache to the first data buffer. The storage system may execute operations to copy the data record by parsing the command block for parameters, or decoding the control fields within the command block, to determine, inter alia, a source address of the data record in the nonvolatile cache, a size of the data record, and a target or destination address of the data record in the first data buffer. The storage system may then actuate one or more electronic circuits or subsystems in a storage controller associated with the storage system, based on the parsed parameters or interpreted control fields, to copy or transfer the data record to the first data buffer. The storage system may then proceed to operation 255.

The storage system may execute operation 222 to determine whether the received command block is a modified XOR-on-the-fly command block. In some embodiments, the storage system may determine whether the received command block is a modified XOR-on-the-fly command block by parsing and/or decoding one or more control fields within the command block. The storage system, for example, may determine that the received command block is a modified XOR-on-the-fly command block when the storage system determines that the command block is an XOR-on-the-fly command block which contains a bit (or other unit of data) for causing the storage system to execute a RAID device write after executing the operations specified by an unmodified XOR-on-the-fly command block. The storage system may continue to operation 223 when the storage system determines that the received command block is not a modified XOR-on-the-fly command block, while the storage system may continue to operation 225 when it determines that the received command block is a modified XOR-on-the-fly command block. The storage system may execute the legacy command block in 223 then may continue to operation 255.

The storage system may execute operation 225 by executing a first operation of the set of operations specified in the received command block (e.g., the modified XOR-on-the-fly command block) to receive a second data record (e.g., read data) from a RAID storage device. In some embodiments, the storage system may receive the second data record by decoding one or more control fields of the modified XOR-on-the-fly command block to actuate electronic circuits for issuing reads requests to the storage device. The one or more control fields may specify, for example, a particular storage device to read from, an address of the record on the storage device, and a size (e.g., a number of blocks, sectors, or other data unit) of the record. The storage system may then read an output of the particular storage device to receive the second data record. In some embodiments, the storage system may store the received data record in a temporary buffer or register file.

The storage system may execute operation 230 by decoding a second one or more control fields of the modified XOR-on-the-fly command block to cause one or more electronic circuits to XOR the first data record with the second data record. In some embodiments, the storage system may decode the second one or more control fields of the modified XOR-on-the-fly command block to cause one or more electronic circuits execute finite field multiply (FFM) the first data record and XOR the results of the FFM with the second data record. The second one or more control fields may specify an address for locating the first data record in the first data buffer. The second one or more fields may further specify a size of the first data record. The result of the XOR operation may be an intermediate parity indicating, for example, bits that differ between the first and second data records. The storage system may store the result of the XOR operation in a second data buffer, as indicated by operation 235. In some embodiments, the first and second data buffer may be the same buffer (or exist in the same memory).

The storage system may execute operation 240 by decoding one or more control fields in the modified XOR-on-the-fly command block to determine whether the command block was generated to execute a data disk update or a parity disk update. In some embodiments, the storage system may make, or resolve, the determination of operation 240 based on a position of the modified XOR-on-the-fly command block in a command block chain for performing a RAID destage. The storage system, for example, may determine that a modified XOR-on-the-fly command block occurring immediately following, for example, a nonvolatile cache copy command block was generated to execute a data disk update. The storage system may additionally determine that modified XOR-on-the-fly command block occurring immediately following, for example, a first modified XOR-on-the-fly (or unmodified XOR-on-fly) command block was generated to execute a parity disk update. In some embodiments, the storage system may make, or resolve, the determination specified in operation 240 based on one or more control fields of the modified XOR-on-the-fly command block. A control field may, for example, include a bit or specify and address that indicates whether the operation specified in the modified XOR-on-the-fly command block is a data or parity disk update operation. The storage system may proceed to operation 245 when it determines that the modified XOR-on-the-fly command block was generated to execute a parity disk update, while the storage system may proceed to operation 250 when it determines that the modified XOR-on-the-fly command block was generated to execute a data disk update.

The storage system may execute operation 245 by writing (e.g., performing a device write operation) the result of the XOR operation executed in operation 230 to the particular storage device (e.g., a parity disk) specified in the modified XOR-on-the-fly command block. The storage system may execute write operations by decoding the bit (e.g., an enable bit) added to the modified XOR-on-the-fly command block to cause one or more electronic circuits to execute the device write. The one or more electronic circuits may determine the particular storage device to write, an address on the particular storage device, and the size of the second data record based on unmodified control fields of the modified XOR-on-the-fly command block. The storage system may further determine an address of the second data record in the data buffer from unmodified control fields of the modified XOR-on-the-fly command block.

The storage system may execute operation 250 by writing the first data record to a storage device specified in the modified XOR-on-the-fly command block. The storage system may execute write operations by decoding the bit (e.g., an enable bit) added to the modified XOR-on-the-fly command block to cause one or more electronic circuits to execute the device write. The one or more circuits may determine the particular storage device to write, an address on the particular storage device, and the size of the second data record from unmodified control fields of the modified XOR-on-the-fly command block. The storage system may further determine an address of the first data record in the data buffer from unmodified control fields of the modified XOR-on-fly command block.

In some embodiments, the data records written in operations 245 and 250 may be written to a same storage device and at a same location specified for reading the second data record in operation 225. Furthermore, operation 245 and 250 may be executed by the storage system without generating or receiving a second control block (e.g., a separate Device Write command block).

In some embodiments, operations 240, 245 and 250 may be combined into a single operation for writing a data record specified by the modified XOR-on-the-fly command block to a storage device.

At operation 255, the storage system may determine whether the work queue contains additional command blocks to process. The storage system may return to operation 210 when the work queue contains additional command blocks, while the storage system may proceed to operation 260 when the work queue does not contain any addition command blocks to process.

While an example embodiment of the operations of flowchart 200 is described herein, other variants of the flowchart 200 are contemplated. In some variants one or more operations of the flowchart 200 may be executed in a different order than indicated in FIG. 2. In other embodiments, additional operations may be added to further the execution of the operations of flowchart 200. In certain embodiments, for example, the storage system may execute operations specified by a command block other than a modified XOR-on-the-fly command block after determining at operation 222 that the command block received in operation 210 was not a modified XOR-on-fly command block.

FIG. 3 depicts a block diagram of an example storage system 300 for implementing a set of operations for controlling a data storage system to reduce the latency associated with RAID storage device update operations, according to various embodiments. The storage system 300 may be a RAID storage system configured to cache data records, in response to write requests received from host computing systems 305A-305N, in a memory (e.g., a nonvolatile memory or cache, or a battery backed volatile memory) and to subsequently transfer the cached records to a RAID storage device according the operations described herein. The storage system 300 may include controller 310, nonvolatile cache 315, work queue 320, memory 330, and redundancy logic unit 345. In certain embodiments, the storage system 300 may include storage devices 325A-325N.

The controller 310 may include a processor, microcontroller, programmable gate array, and/or any other logic circuit that is programmable or configurable to execute a set of logic operations. In some embodiments, the controller 310 may include a finite state machine. The controller 310 may be configured to receive a request to read data records from, or to write data records to, the storage system 300. The controller 310 may receive the request from any of host computing systems 305A-305N via a data bus interface (e.g., a peripheral component interconnect bus). The controller 310 may be further configured to receive, generate, and decode command blocks to orchestrate the interaction of the components of the storage system 300 to perform the operations of this disclosure.

The nonvolatile cache 315 may be a memory subsystem including one or more arrays of non-volatile random access memory devices (e.g., flash memory). The storage system 300 may use the nonvolatile cache 315 to temporarily store data records that are to be written to system. In an alternative embodiment, the cache 315 may be a volatile memory.

The work queue 320 may be a data structure in a memory of the storage system 300 (e.g., work queue 320 may be a data structure in memory 330) and managed by, for example, controller 310. The work queue 320 may receive command blocks from the storage system 300 and store them for future decoding and execution. In some embodiments, command blocks may be generated by the storage system 300 and added to the work queue 315 in response to decoding and/or execution operations specified in another command block.

The storage devices 325A-325N may include one or more small computer system interface (SCSI) enabled storage devices (e.g., a hard disk drive, or a solid state drive). In some embodiments, the storage devices 325A-325N may include storage devices for storing data received from host computing systems 305A-305N (e.g., a data storage devices), and storage devices for storing parity data generated from the received data (e.g., parity storage devices). The storage devices 325A-325N may include processing components for receiving and processing read and write (or update) requests from the storage system 300. In some embodiments, the storage devices 325A-325N may receive the request in SAS command bocks specifying, for example, a location and size of a record to retrieve or update.

The memory 330 may be an array of non-persistent memory (e.g., dynamic or static random access memory) configured to temporarily store or buffer data for processing by the storage system 300. The memory 330 may include first buffer 335 and second buffer 340. In alternate embodiments, the memory 330 may be a persistent memory.

The redundancy logic block 345 may be a set of one or more electronic circuits for performing finite field multiplications and XOR logic operations (e.g., bitwise XOR operations) on two or more data records as described herein. In some embodiments, the redundancy logic block 345 may be part of a larger logic block for performing logic operations on data records on the behalf of the storage system 300. In certain embodiments, the redundancy logic block 345 may be a component of the controller 310.

Figure 4:
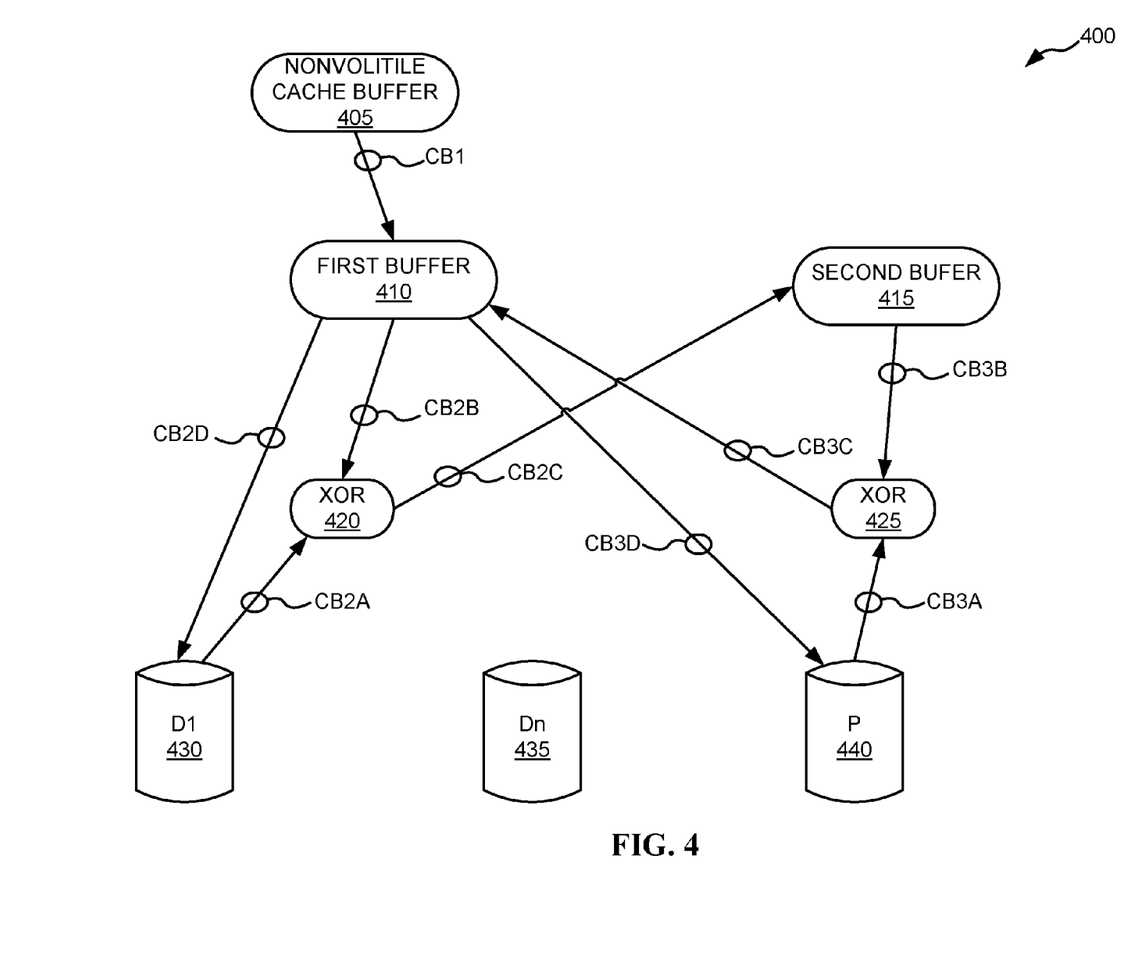
FIG. 4 depicts a block diagram of an example RAID 5 destage operation, according to various embodiments, according to various embodiments.

FIG. 4 depicts a block diagram of an example RAID 5 destage operation 400, according to various embodiments. The example destage operation may be executed by a storage system such as the storage system 300 (FIG. 3). As depicted in FIG. 4, the storage system, implementing the techniques described herein for combining an XOR-on-the-fly command block with a Device Write command block, may execute the destage operation by decoding and executing a set of operations defined in a chain of 3 command blocks (e.g., CB1, CB2, and CB3).

A first command block in chain, CB1, specifies an operation to copy (or transfer) a first data record from a nonvolatile cache 405 to a memory buffer 410.

A second command block in the chain, represented by CB2A-CB2D, may be a modified XOR-on-the-fly command block, as described herein. The second command block may specify operations to read a second data record from a storage device 430 (or storage device 435) and XOR (e.g., using XOR logic 420) the second data record with the first data record, as depicted by direction arrows CB2A and CB2B. The second command block may additionally specify an operation to store the result of the XOR operation in a second buffer 415, as depicted by direction arrow CB2C. This second operation may create an intermediate parity block, as described herein. In some embodiments, the second command block may further specify an operation to write the first data record to storage device 430, as shown by direction arrow CB2D.

A third command block may be another modified XOR-on-fly command block for generating an updated parity block for first data record (e.g., a parity block for the bits in the first data record) and writing it to storage device 440. A first operation specified by the third command block may direct storage system to read a parity record (e.g., a parity block for the second data record read by the second modified XOR-on-the-fly command block) from a storage device 440 and XOR (e.g., using XOR logic 425) the parity record for the second data record with the intermediate parity block generated from the XOR operation specified by the second command block, as depicted by direction arrows CB3A and CB3B. A second operation specified by the third command block may direct the storage system to store the result of this second XOR operation in the first buffer 410, as depicted by direction arrow CB3C. This second operation may create the updated parity block for the first data record, as described herein. In some embodiments, the third command block may further specify a Device Write operation to write the updated parity bock to storage device 440, as depicted by direction line CB3D. As described herein, this Device Write operation may be executed by the storage system immediately after the second XOR operation without the storage system executing an operation from a different command block before the execution of the Device Write operation.

Figure 5:
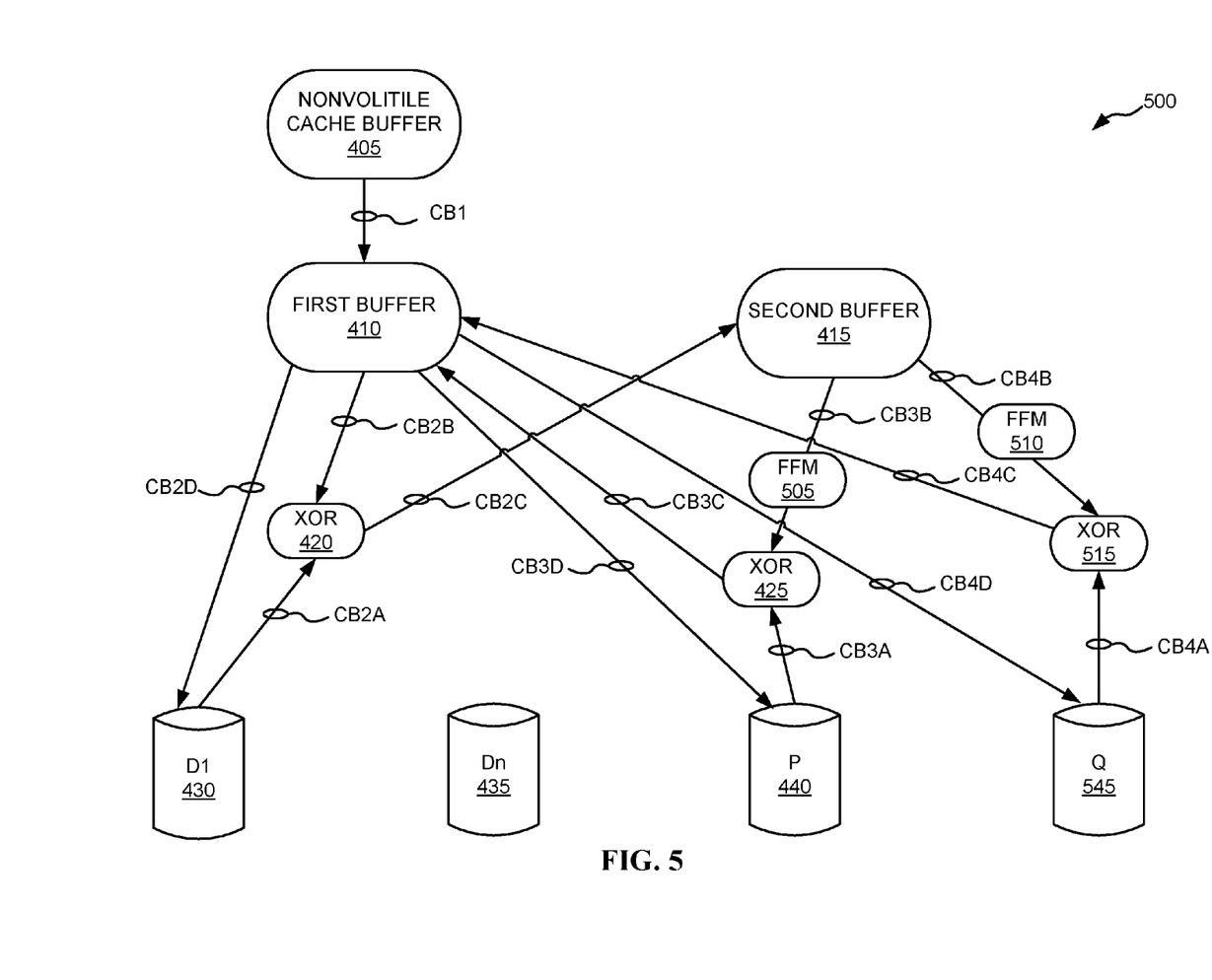
FIG. 5 depicts a block diagram of an example RAID 6 destage operation, according to various embodiments, according to various embodiments.

FIG. 5 depicts a block diagram of an example RAID 6 destage operation 500, according to various embodiments. A RAID 6 destage operation may be substantially similar to the RAID 5 destage operation described in FIG. 4, with the addition of an additional layer of parity implementing a double parity scheme for correcting multiple devices failures. The example destage operation may be executed by a storage system such as the storage system 300 (FIG. 3). As depicted in FIG. 5, the storage system, implementing the techniques described herein for combining an XOR-on-the-fly command block with a Device Write command block, may execute the RAID 6 destage operation by decoding and executing a set of operations defined in a chain of 4 command blocks. The chain for 4 command blocks may include 3 command blocks for executing substantially the same operations described in FIG. 4, and 1 additional command block for generating/updating a second parity block, as described herein.

The storage system may execute the first 3 command blocks in the chain in substantially the same manner as the 3 command blocks that were executed by the storage system described in FIG. 4. In certain embodiments the third command block discussed in FIG. 4 may specify a finite field multiplication (FFM 505) after the reading the second buffer 415 (as indicated by CB3B), but before the contents of the second buffer is XORed (425) with the parity record read form the storage device 440. The fourth command block by may be required to complete a RAID 6 double parity update. This fourth command block may specify a first operation to cause the storage system to read a parity record (e.g., a second parity block of a RAID 6 double parity scheme) from the storage device 545 and XOR (e.g., using XOR logic 515) the parity record with a another data record (e.g., the updated parity block described in FIG. 4), as depicted by direction arrows CB4A and CB4B. The fourth command block may additionally specify a Finite Field Multiply (FFM 510) to be executed on data the Second Buffer 415 as it is read from the second buffer 415 (as depicted by CB4B), with the result of the FFM being XORed (515) with the device data CB4A. The fourth command block may additionally specify an operation to store the result of the XOR operation in the first buffer 410, as depicted by direction arrow CB4C. In some embodiments, the second command block may further specify a Device Write operation to write the result of the XOR operation to storage device 545, as depicted by direction arrow CB4D. As described herein, this Device Write operation may be executed by the storage system immediately after the XOR operation without the storage system executing an operation from a different command block before the execution of the Device Write operation or generating or queuing a separate Device Write command block.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for performing a cycle update on a redundant array of independent disks (RAID) storage device by a storage system, comprising:
   storing first data in a first buffer;
   retrieving a command block associated with the first data from a command block queue;
   executing the command block to perform a set of operations in a sequence specified by the command block, the set of operations including
      reading second data from an address of the RAID storage device,
      generating redundant data based on the first data with the second data
         wherein the RAID storage device is a parity storage device,
         determining, by the RAID storage device, the retrieved command block is a modified exclusive or (XOR)-on-the-fly command block,
         wherein the determining is done by parsing one or more control fields,
      XORing the first data with the second data to produce the redundant data,
         wherein the one or more control fields specifies an address of the first data,
         wherein the one or more control fields specifies a size of the first data,
      storing the redundant data in a second buffer;
   writing the first data to the address of the RAID storage device when the RAID storage device is a data storage device; and
   writing the redundant data stored in the second buffer to the address of the RAID storage device when the RAID storage device is a parity storage device.

2. The method of claim 1, wherein the generating the redundant data further includes finite field multiplying the first data and XORing a result of the finite field multiplying with the second data to produce the redundant data.

3. The method of claim 1, wherein the RAID storage device is at least one of a data storage device and a parity storage device.

4. The method of claim 1, wherein the command block is an XOR-on-the-fly command block modified to have a data value to cause the storage system to execute the writing immediately following completion of the reading when the RAID storage device is a data storage device.

5. The method of claim 1, wherein the command block is part of a command block chain to perform at least one of a RAID-5 and RAID-6 cache destage operation.

6. The method of claim 1, wherein the command block is part of a command block chain to perform at least one of a RAID-5 and RAID-6 cache parity update operation.

7. The method of claim 1, wherein the first data includes a same number of bits as the second data.

8. The method of claim 1, wherein the command block is an XOR-on-the-fly command block modified to have a data value to cause the storage system to execute the writing immediately following the storing the redundant data when the RAID storage device is a parity storage device.

9. A storage system, comprising:
   a memory, including first and second buffers; and
   a storage controller having a processing circuit to
      store first data in the first buffer,
      retrieve a command block associated with the first data from a command block queue,
      execute the command block to perform a set of operations in a sequence specified by the command block, the set of operations to cause to storage system to
         read second data from an address of a redundant array of independent disks (RAID) storage device,
         generate redundant data based on the first data with the second data,
            wherein the RAID storage device is a parity storage device,
            determine, by the RAID storage device, the retrieved command block is a modified exclusive or (XOR)-on-the-fly command block,
            wherein the determining is done by parsing one or more control fields,
         XOR the first data with the second data to produce the redundant data,
            wherein the one or more control fields specifies an address of the first data,
            wherein the one or more control fields specifies a size of the first data
         store the redundant data in a second buffer,
      write the first data to the address of the RAID storage device when the RAID storage device is a data storage device, and
      write the redundant data stored in the second buffer to the address of the RAID storage device when the RAID storage device is a parity storage device,
         wherein the write is executed immediately following completion of the read.

10. The storage system of claim 9, wherein the set of operations cause the storage system to generate redundant data based on the first data with the second data by finite field multiplying the first data and XORing a result of the finite field multiplying with the second data to produce the redundant data.

11. The storage system of claim 9, wherein the RAID storage device is at least one of a data storage device and a parity storage device.

12. The storage system of claim 9, wherein the command block is an XOR-on-the-fly command block modified to have a data value to cause the storage system to write the first data or the redundant data immediately following completion of the read when the RAID storage device is a data storage device.

13. The storage system of claim 9, wherein the command block is part of a command block chain to perform at least one of a RAID-5 and RAID-6 cache destage operation.

14. The storage system of claim 9, wherein the command block is part of a command block chain to perform at least one of a RAID-5 and RAID-6 cache parity update operation.

15. The storage system of claim 9, wherein the first data includes a same number of bits as the second data.

16. The storage system of claim 9, wherein the command block is an XOR-on-the-fly command block modified to have a data value to cause the storage system to write the redundant data immediately following the storing the redundant data in the second buffer when the RAID storage device is a parity storage device.

* * * * *